United States Patent [19]

Yamamoto et al.

[11] 4,364,572
[45] Dec. 21, 1982

[54] SEAL ASSEMBLY WITH LOAD RING

[75] Inventors: Teiji Yamamoto, Kadoma; Tsukasa Yamazaki, Hirakata, both of Japan

[73] Assignee: Kabushiki Kaisha Komatsu Seisakusho, Tokyo, Japan

[21] Appl. No.: 250,598

[22] Filed: Apr. 3, 1981

[30] Foreign Application Priority Data

Sep. 10, 1979 [JP] Japan .............................. 54-123919

[51] Int. Cl.³ ............................................. F16J 15/32
[52] U.S. Cl. ....................................... 277/92; 305/11
[58] Field of Search ............................. 277/92; 305/11

[56] References Cited

U.S. PATENT DOCUMENTS

| 3,841,718 | 10/1974 | Reinsma | 305/11 |
| 4,062,550 | 12/1977 | Satsumabayashi et al. | 277/92 |
| 4,089,531 | 5/1978 | Roley et al. | 277/92 |
| 4,179,130 | 12/1979 | Fass et al. | 305/11 |
| 4,248,439 | 2/1981 | Haslett | 277/92 |
| 4,331,339 | 5/1982 | Reinsma | 277/92 |

Primary Examiner—Robert I. Smith
Attorney, Agent, or Firm—Armstrong, Nikaido, Marmelstein & Kubovcik

[57] ABSTRACT

A seal for a joint subjected to oscillatory motion having a W-shaped seal ring in an unloading condition which encompasses a load ring. The W-shaped seal ring comprises a driving flange, a sealing flange and a bight portion interconnecting the two flanges. The load ring is adapted to be fitted in the seal ring to force the driving flange into an interference fit with the counterbore walls so as to cause the driving torque to be applied through the seal ring. The thickness of the driving flange and the bight portion is made substantially same so as to ensure enough rigidity in the radial direction while allowing the seal ring to deform readily in the axial direction.

1 Claim, 5 Drawing Figures

I FIRST PRIOR ART
II PRESENT INVENTION

SEAL ASSEMBLY WITH LOAD RING

BACKGROUND OF THE INVENTION

This invention relates to a seal adapted to be used for track link connections for construction vehicles such as bulldozers and the like.

One of the conventional seal rings which has been employed in the seals of the kind specified comprises, as disclosed in U.S. Pat. No. 3,841,718, a driving flange, a sealing flange and a bight portion of a thin wall thickness connecting the two flanges.

When this seal ring is set together with a load ring in the counterbore defined by a bushing and a link, because the thickness of the bight portion is thin, the bight portion tends to deform inwardly to a large extent and contacts with a thrust ring so that the inclination of the load-deflection curve will change and therefore required stable load-deflection characteristics can not be obtained. Further, because the seal ring of the above-mentioned type has a small rigidity, when it is set in loaded position, the seal flange tends to be subjected to an abnormal deformation, thus causing earlier wear-down of the sealing surface.

Another type of seal assembly is disclosed in U.S. Pat. No. 4,062,550, the assignee of which is the same as that of the present application. However, it revealed by the results of later experiments that the seal ring of this type could not exhibit such a durability as expected. The reason envisaged for it is that, because the sealing flange of the seal ring is kept into contact with the end face of the bushing in a wide sealing surface, there is a tendency of occurrence of oil leaks.

SUMMARY OF THE INVENTION

It is therefore an object of the present invention to provide a seal assembly with a backup load ring which can effectively overcome the above noted problems. Another object of the present invention is to provide a seal assembly comprising a seal ring and a backup load ring wherein the seal ring has a high rigidity against the deformation in the radial direction while allowing an easy deformation in the axial direction.

In accordance with an aspect of the present invention, there is provided a seal assembly comprising: first and second axially spaced members mounted for relative rotation about a common axis, said first member having a counterbore formed in one face thereof, said second member having an end face opposite the counterbore; a third member disposed between said first and second members; a seal ring of tough abrasion-resistant material having a W-shaped cross-section in an unloaded condition disposed within the counterbore with the W-shaped cross-section defining an annular groove facing the side wall of the counterbore, said seal ring including a driving flange engaged in non-rotative driving contact with the side wall and an end wall of the counterbore at the juncture of these walls, a sealing flange adapted to be engaged in annular lip sealing rotative contact with the end face of said second member and bight portion interconnecting said driving and sealing flanges, the thickness of the driving flange and the bight portion being made substantially same and the thickness of the sealing flange being made thicker than that of the driving flange and the bight portion; and a load ring of elastmeric material having substantial spring response characteristics, said load ring being disposed within the annular groove of the W-shaped seal ring and engaging substantially the entire inner wall surface of the sealing flange and being axially compressed between the driving flange and the sealing flange, wherein said seal ring is compressed between said first and second members when loaded in place and the shape of cross-section is transformed from W-shape to C-shape having a substantially straight bight portion interconnecting the flanges with keeping a spacing between the bight portion of said seal ring and said third member.

The above and other objects, features and advantages of the present invention will be readily apparent from the following description taken in conjunction with the accompanying drawings.

DESCRIPTION OF THE PREFERRED EMBODIMENT

Figure 1:
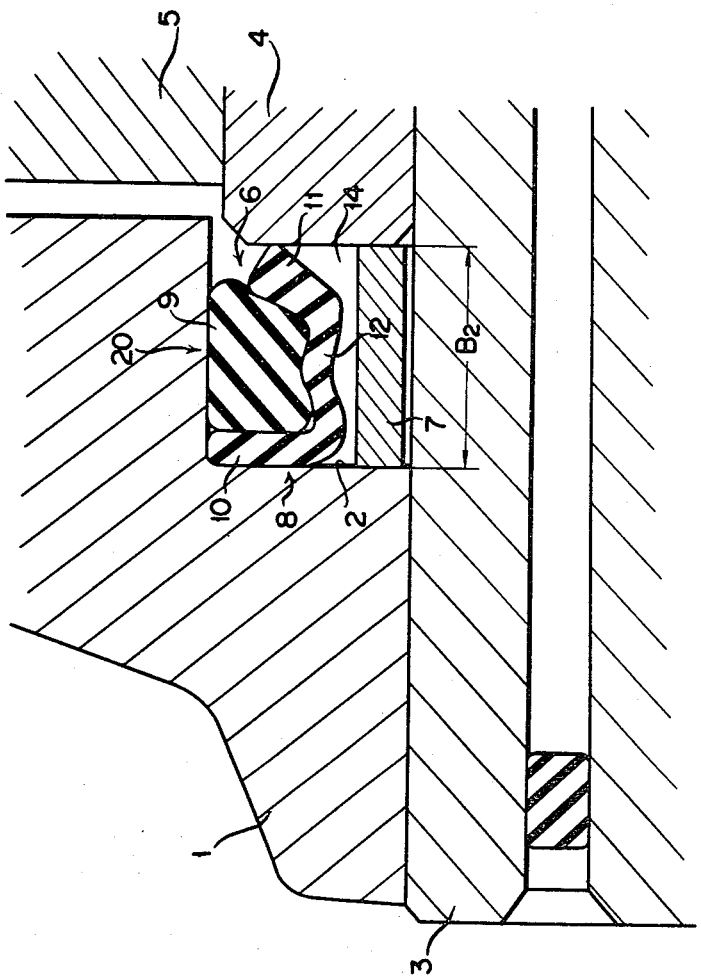
FIG. 1 is a longitudinal sectional view of a seal assembly for linkage connectings of endless tracks according to the present invention.
Figure 2:
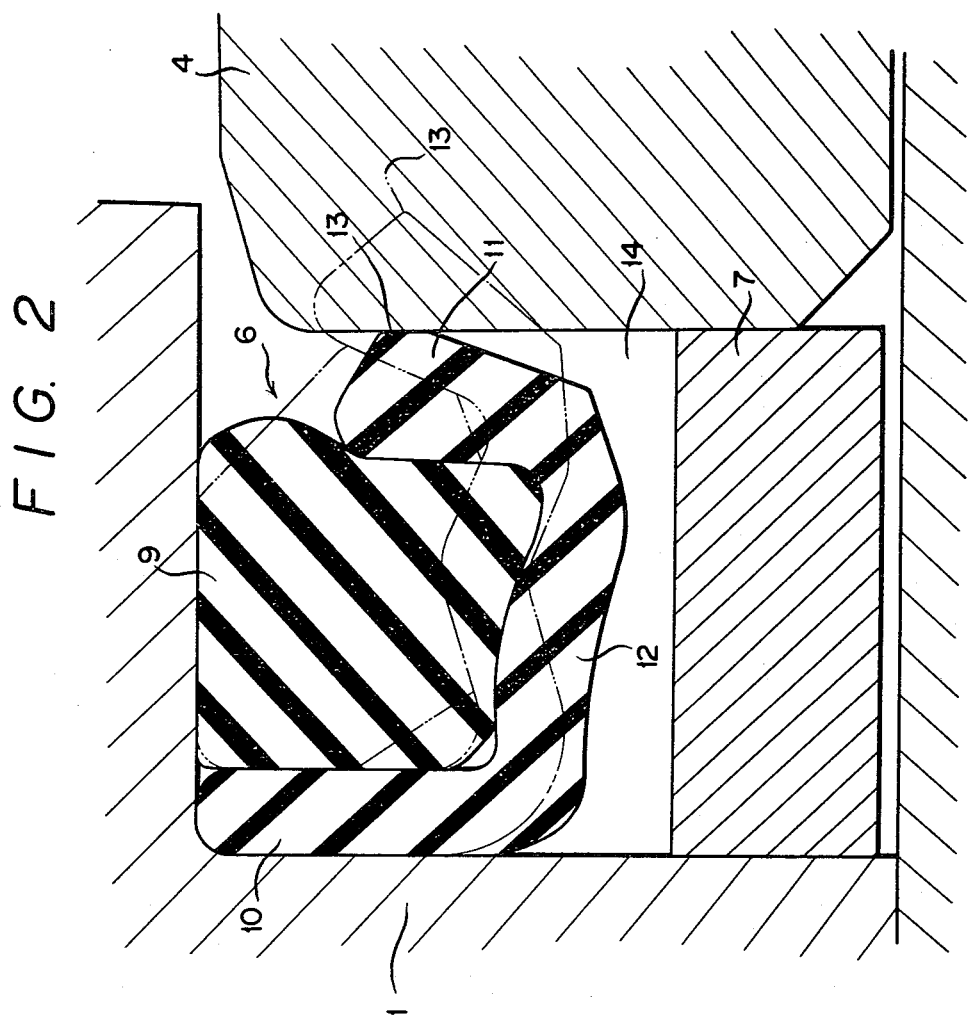
FIG. 2 is an enlarged view of FIG. 1 in which the seal in an unloaded free condition is shown by imaginary lines.

The present invention will now be described below by way of example only with reference to the accompanying drawings.

In the drawings, reference numeral 1 denotes one of links which has a recess 2 formed therein and in which a pin 3 is forcibly fitted.

Another link 5 is fitted through a bushing 4 to the pin 3.

One end of the bushing 4 is inserted into the recess 2 to define a counterbore 20 therebetween.

Mounted in the counterbore 20 are a seal 6 and a thrust ring 7.

The seal 6 comprises a seal ring 8 and a load ring 9. The seal ring 8 has a generally W-shaped cross-section and comprises a driving flange 10, a sealing flange 11 having a liplike sealing surface 13 and a bight portion 12 connecting the two flanges.

Figure 3:
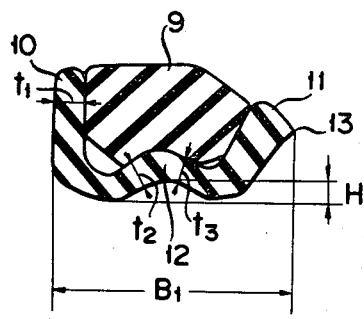
FIG. 3 is a cross-sectional view of the seal which is unloaded free condition.

As shown in FIG. 3, if the thickness of the driving flange 10 of the seal ring 8 is represented by $t_1$ and those of the bight portion 12 at two places are indicated by $t_2$ and $t_3$, respectively, the following relationship exists.

$$t_1 = t_2 = t_3 \approx 1.4 \text{ to } 1.8 \text{ mm}$$

If and when the rate of deflection of the seal 6, $\alpha = (B_1 - B_2)/B_1$ is set at about 17%, the seal ring 8 can possess a sufficient rigidity without imparing its inherent flexibility.

When the seal ring 8 is in free state, there is provided a difference H between the highest part of the bight portion 12 and the lowest part thereof. When the seal ring 8 is set into the counterbore 20, the difference H will become approximately zero thereby eliminating the interference between the seal ring 8 and the thrust ring 7.

When the above-mentioned seal 6 is set in the counterbore 20, the lip 13 of the sealing flange 11 is urged against the end face of the bushing 4, and a space 14 is formed between the seal ring 8 and the thrust ring 7.

Figure 4:
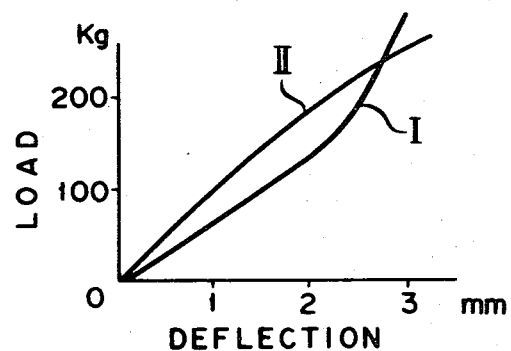
FIG. 4 is a graph showing a relationship between a load imposed on the seal ring and a deflection thereof in the axial direction.

Since the seal ring 8 has an approximately equal wall thickness except the sealing flange 11, it possesses a large rigidity. Further, because the seal ring 8 per se is not brought into contact with the thrust ring 7, the rate of fluctuation in the loading excerted on the lip sealing face 13 becomes low and stable. A load-deflection curve of the seal ring 8 is shown by reference numeral II in FIG. 4. In this graph, reference numeral I denotes a load-deflection curve of the seal assembly disclosed in U.S. Pat. No. 3,841,718.

Further, since the seal ring 8 according to the present invention has a generally W-shaped cross-section, the rigidity of the seal ring in the radial direction can be increased, whilst its rigidity in the axial direction can be reduced because of the presence of readily deformable W-shaped wavy portion. When the rigidity of the seal ring in the radial direction is large, the possible occurrence of abnormal deformation and bending of the seal ring when it is set in position in the counterbore can be prevented. Further, when the rigidity in the axial direction is small, a seal assembly having stable load-deflection characteristerics and a small spring constant can be obtained.

Figure 5:
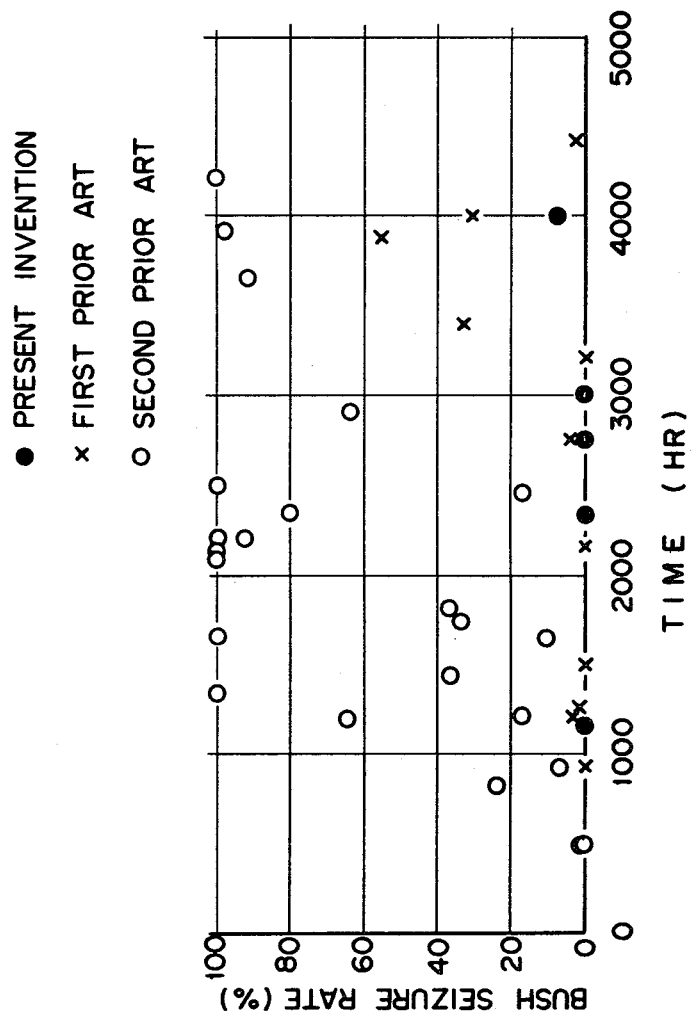
FIG. 5 is a comparative graph showing the service life of seal assemblies of the present invention and first and second prior art devices mentioned in the background of the invention, the first prior art being U.S. Pat. No. 3,841,718 and second prior art being U.S. Pat. No. 4,062,550.

FIG. 5 is a graph showing the relationship between the service time of seal assemblies and the rate of generation of seizure of bushings due to oil leaks wherein a comparison between the seal assembly of the present invention and the aforementioned two types of prior art seal assemblies are shown. As can be clearly seen from the graph, as compared to the prior art seal assemblies, in the case of the seal assembly of the present invention, there occurs almost no seizures of the bushing even if its service time is extended.

As described in detail hereinabove, the present invention is characterized by that the seal 6 adapted to be set in the counterbore 20 defined by the link 1 and the bushing 4 is comprised of a seal ring 8 having a generally W-shaped cross-section and having a generally equal wall thickness except sealing flange 11 and of a load ring 9 to be fitted into the seal ring 8, and a space or clearance 14 is formed between the seal ring 8 and the thrust ring 7.

Therefore, the seal ring 8 per se can possess an appropriate rigidity without imparing its inherent flexibility, and because the seal ring 8 is not brought into contact with the thrust ring 7, the rate of fluctuation in the load exerted on the sealing face will become low and stable thereby eliminating a possible earth and sand intrusion and enhancing sealing effect.

It is to be understood that the foregoing description is merely illustrative of a preferred embodiment of the present invention, and that the scope of the invention is not to be limited thereto, but is to be determined by the scope of the appended claim.

What we claim is:

1. A seal assembly comprising:

first and second axially spaced members mounted for relative rotation about a common axis, said first member having a counterbore formed in one face thereof, said second member having an end face opposite the counterbore;

a third member disposed between said first and second members;

a seal ring of tough abrasion-resistant material having a W-shaped cross-section in an unloaded condition disposed within the counterbore with the W-shaped cross-section defining an annular groove facing the side wall of the counterbore, said seal ring including a driving flange engaged in non-rotative driving contact with the side wall and an end wall of the counterbore at the juncture of these walls, a sealing flange adapted to be engaged in annular lip sealing rotative contact with the end face of said second member and a bight portion interconnecting said driving and sealing flanges, the thickness of the driving flange and the bight portion being made substantially same and the thickness of the sealing flange being made thicker than that of the driving flange and the bight portion; and a load ring of elastmeric material having substantial spring response characteristics, said load ring being disposed within the annular groove of the W-shaped seal ring and engaging substantially the entire inner wall surface of the sealing flange and being axially compressed between the driving flange and the sealing flange;

wherein said seal ring is compressed between said first and second members when loaded in place and the shape of cross-section is transformed from W-shape to C-shape having a substantially straight bight portion interconnecting the flanges with keeping a spacing between the bight portion of said seal ring and said third member.

* * * * *